United States Patent
Oxley

(10) Patent No.: US 6,505,611 B1
(45) Date of Patent: Jan. 14, 2003

(54) INTEGRATED FUEL CONTROL UNIT FOR GAS-OPERATED ENGINES

(75) Inventor: Lonnie Oxley, Versailles, KY (US)

(73) Assignee: GFI-USA, Inc., Plymouth Township, MI (US)

( * ) Notice: Subject to any disclaimer, the term of this patent is extended or adjusted under 35 U.S.C. 154(b) by 0 days.

(21) Appl. No.: 09/561,164

(22) Filed: Apr. 28, 2000

Related U.S. Application Data
(60) Provisional application No. 60/132,112, filed on Apr. 30, 1999.

(51) Int. Cl.$^7$ .............................................. F02B 43/00
(52) U.S. Cl. ....................................................... 123/527
(58) Field of Search ......................................... 123/527

(56) References Cited

U.S. PATENT DOCUMENTS

| | | | |
|---|---|---|---|
| 4,423,716 A | * 1/1984 | Glass | 123/527 |
| 4,813,394 A | * 3/1989 | St. Clair | 123/527 |
| 4,829,957 A | * 5/1989 | Garretson et al. | 123/527 |
| 5,101,799 A | * 4/1992 | Davis et al. | 123/527 |
| 5,117,798 A | * 6/1992 | Nozaki | 123/27 GE |
| 5,146,903 A | 9/1992 | Baverstock | |
| 5,150,690 A | * 9/1992 | Carter et al. | 123/527 |
| 5,549,097 A | 8/1996 | Nimberger | |
| 5,584,467 A | * 12/1996 | Harnett et al. | 123/527 |
| 5,752,489 A | 5/1998 | Henderson et al. | |
| 6,131,552 A | * 10/2000 | Paielli et al. | 123/527 |

* cited by examiner

Primary Examiner—Noah P. Kamen
Assistant Examiner—Jason Benton
(74) Attorney, Agent, or Firm—Volpe and Koenig, P.C.

(57) ABSTRACT

An integrated fuel control unit for gas-operated internal combustion engines that includes a base on which a primary diaphragm is secured to define a primary fuel chamber. A primary fuel orifice is carried by the base, as is a primary control lever that is coupled to the primary diaphragm for controlling flow of fuel through the primary orifice as a function of inlet fuel pressure and engine demand. A secondary diaphragm is also secured to the base to define a secondary fuel chamber. A secondary orifice is carried by the base between the primary and secondary chambers, and a secondary control lever is coupled to the secondary diaphragm for controlling flow of fuel through the secondary orifice as a function of engine demand. A heat exchange section in the body receives engine coolant or engine oil for heat exchange with fuel so as to heat and vaporize the fuel between the primary and secondary chambers. A high-pressure fuel lock-off is carried by the body, and includes a solenoid coil mounted on the body and a solenoid plunger within the coil for selectively closing an end of the primary orifice remote from the primary control lever. A fuel inlet filter is carried by the body for filtering fuel prior to passage to the primary orifice and the lock-off. The solenoid plunger is normally urged by fuel inlet pressure and by a plunger spring to close the primary orifice, and is withdrawn from the primary orifice against the force of the spring by energization of the solenoid coil when the engine is operating. This feature helps ensure that fuel will not flow to the engine when the engine is not operating.

13 Claims, 4 Drawing Sheets

INTEGRATED FUEL CONTROL UNIT FOR GAS-OPERATED ENGINES

This application claims the benefit of application Ser. No. 60/132,112 filed Apr. 30, 1999.

The present invention is directed to control of fuel flow in gas-operated internal combustion engines, such as LPG and natural gas engines, and more particularly to an integrated control unit that includes a fuel inlet filter, a high-pressure fuel lock-off and a pressure regulator/vaporizer.

BACKGROUND AND SUMMARY OF THE INVENTION

It is a general object of the present invention to provide a fuel control unit for gas-operated internal combustion engines in which a fuel inlet filter, a high-pressure lock-off and a fuel vaporizer/pressure regulator are integrated into a single assembly. Another and more specific object of the invention is to provide an integrated control unit of a described character that includes a device for affirmatively blocking fuel flow when the engine is not in operation. The integrated control unit of the invention has the further objective of reducing assembly time and the number of component parts that would otherwise be necessary in systems in which the several sections are provided as separate units. Furthermore, the integrated control unit of the invention has the objective of requiring a reduced amount of installation space on or associated with the engine.

An integrated fuel control unit for gas-operated internal combustion engines in accordance with a presently preferred embodiment of the invention includes a base on which a primary diaphragm is secured to define a primary fuel chamber. A primary fuel orifice is carried by the base, as is a primary control lever that is coupled to the primary diaphragm for controlling flow of fuel through the primary orifice as a function of inlet fuel pressure and engine demand. A secondary diaphragm is also secured to the base to define a secondary fuel chamber. A secondary orifice is carried between the primary and secondary chambers, and a secondary control lever is coupled to the secondary diaphragm for controlling flow of fuel through the secondary orifice as a function of engine demand. A heat exchange section in the body receives engine coolant or engine oil for heat exchange with fuel so as to heat and vaporize the fuel between the primary and secondary chambers. A high-pressure fuel lock-off is carried by the body, and includes a solenoid coil mounted on the body and a solenoid plunger within the coil for selectively closing an end of the primary orifice remote from the primary control lever. A fuel inlet filter is carried by the body for filtering fuel prior to passage to the primary orifice and the lock-off. The solenoid plunger is normally urged by fuel inlet pressure and by a plunger spring to close the primary orifice, and is withdrawn from the primary orifice against the force of the spring by energization of the solenoid coil when the engine is operating. This feature helps ensure that fuel will not flow to the engine when the coil is not energized and the engine is not operating.

In accordance with a particularly preferred embodiment of the invention, the integrated fuel control unit for gas-operated internal combustion engines includes abase in which a primary fuel orifice with on/off lock-off control is on one end and a primary chamber variable fuel control valve is on the opposite end. The high pressure fuel lock-off is carried by the body, and includes a solenoid coil mounted on the body and a solenoid plunger within the coil for selectively closing an end of the primary orifice remote from the primary control lever. A fuel inlet is carried by the body and filter housing cover for filtering fuel prior to passage to the lock-off and primary orifice. The solenoid plunger is normally urged by fuel inlet pressure and by a plunger spring to close the lock-off end of orifice and is withdrawn from the lock-off end of orifice against the force of the spring by energization of the coil when the engine is operating or when activating during start mode. This feature ensures that fuel will not flow to the engine when the coil is not energized and the engine is not operating. By locating the lock-off in close proximity to the primary orifice, residual fuel is minimized allowing near instantaneous fuel shut-off via selectively de-energizing the lock-off coil (key switch). This prevents backfire in high duty cycle, hot engine applications after the key is turned off. The primary diaphragm and primary chamber housing cover is secured to this base to define a primary fuel chamber. A primary fuel orifice seat is carried by the base, as is a primary control lever that is coupled to the primary diaphragm and primary spring for control of fuel flow through the primary orifice as a function of inlet fuel pressure, temperature dependent fuel vaporization pressure and engine demand. A secondary diaphragm is also secured between the base and secondary cover to define a secondary fuel chamber. A secondary orifice is carried by the primary cover between the primary and secondary chambers, and a secondary lever is coupled to the secondary diaphragm and secondary spring for controlling flow of fuel through the secondary orifice as a function of engine demand. A heat exchange section in the body receives engine coolant or engine oil for heat exchange with fuel so as to heat and vaporize the fuel between the primary and secondary chambers. For air-cooled engines, the coolant passage can be replaced by fins integral with or of the same material as the body. These fins transfer heat into the body to heat and vaporize the fuel. This alternative configuration can also be used as a vapor only system.

BRIEF DESCRIPTION OF THE DRAWINGS

The invention, together with additional objects, features and advantages thereof, will be best understood in the following description and the accompanying drawings, in which.

DETAILED DESCRIPTION OF PREFERRED EMBODIMENTS

Figure 2:
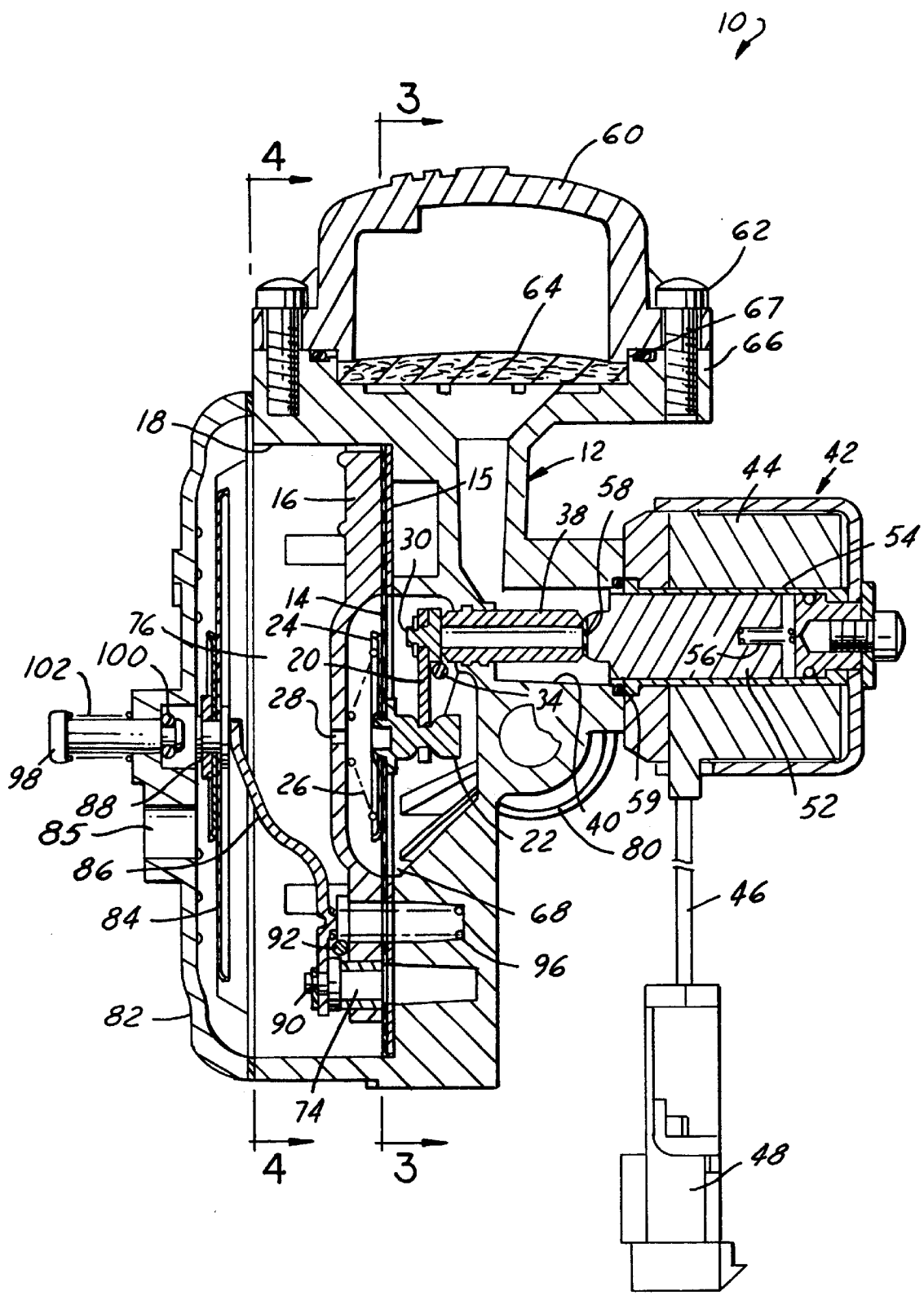
FIG. 2 is a sectional view of the integrated control unit illustrated in FIG. 1.
Figure 3:
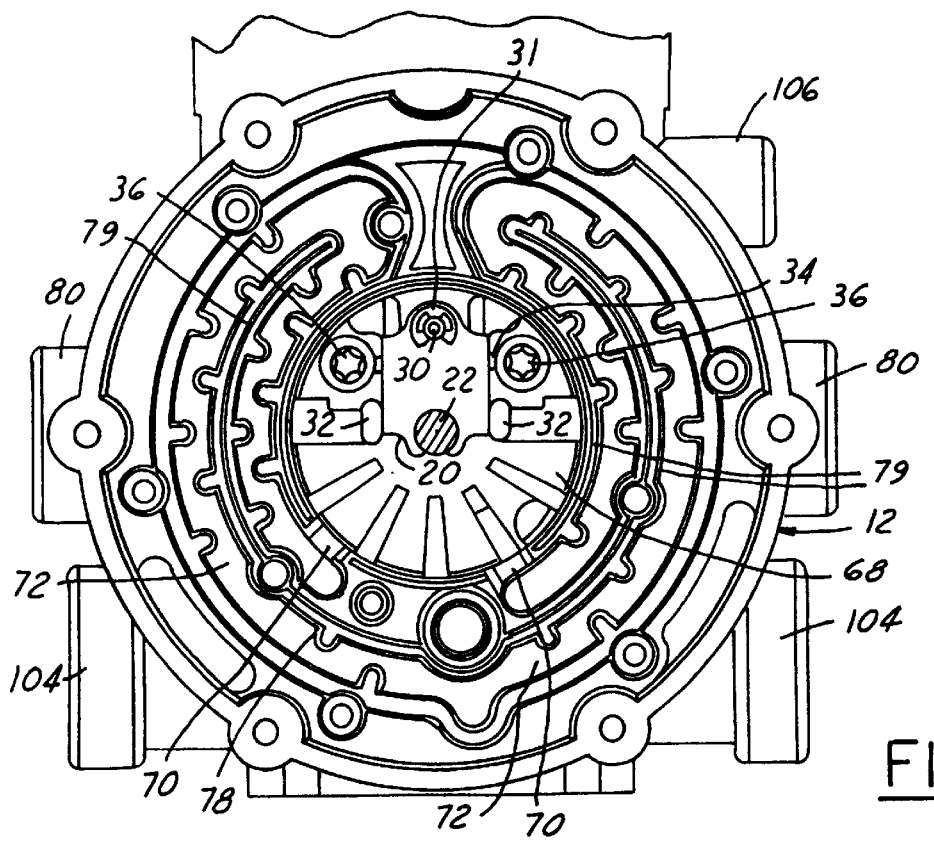
FIGS. 3 and 4 are fragmentary sectional views taken substantially along the respective lines 3—3 and 4—4 in FIG. 2.
Figure 4:
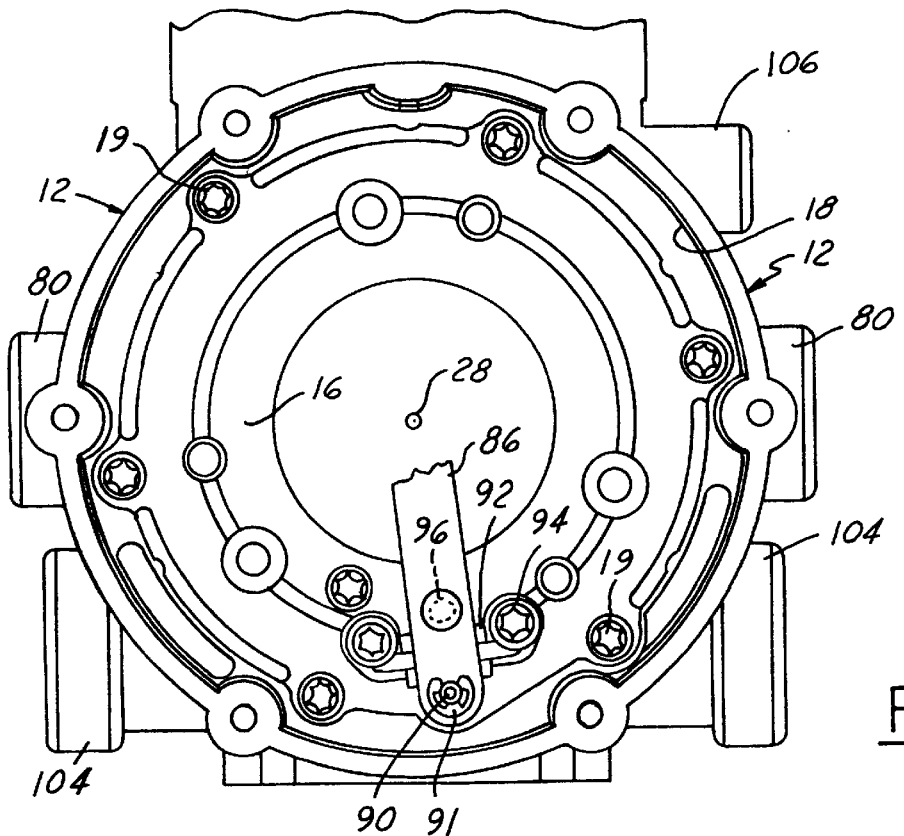

The drawings illustrate an integrated fuel control unit 10 in accordance with a presently preferred embodiment of the invention as comprising a base 12 of suitable metal heat-conductive composition, such as aluminum. A primary diaphragm 14 (FIG. 2) and gasket 15 are captured by a plate 16 within a pocket 18 on base 12. Plate 16 is secured by screws 19 (FIG. 4). A primary control lever 20 (FIGS. 2 and 3) has one end secured by a link 22 to a diaphragm plate 24 centrally carried by diaphragm 14. A spiral coil spring 26 is captured in compression between diaphragm plate 24 and the opposing surface of plate 16, with a passage 28 extending through plate 16 to vent the chamber between diaphragm 14 and plate 16. A seal 30 is secured by a snap ring 31 to the opposing end of lever 20. Lever 20 is laterally captured between a pair of bosses 32 (FIG. 3) that extend integrally from base 12, and is pivotally carried on a pin 34 secured by screws 36 to base 12.

Figure 1:
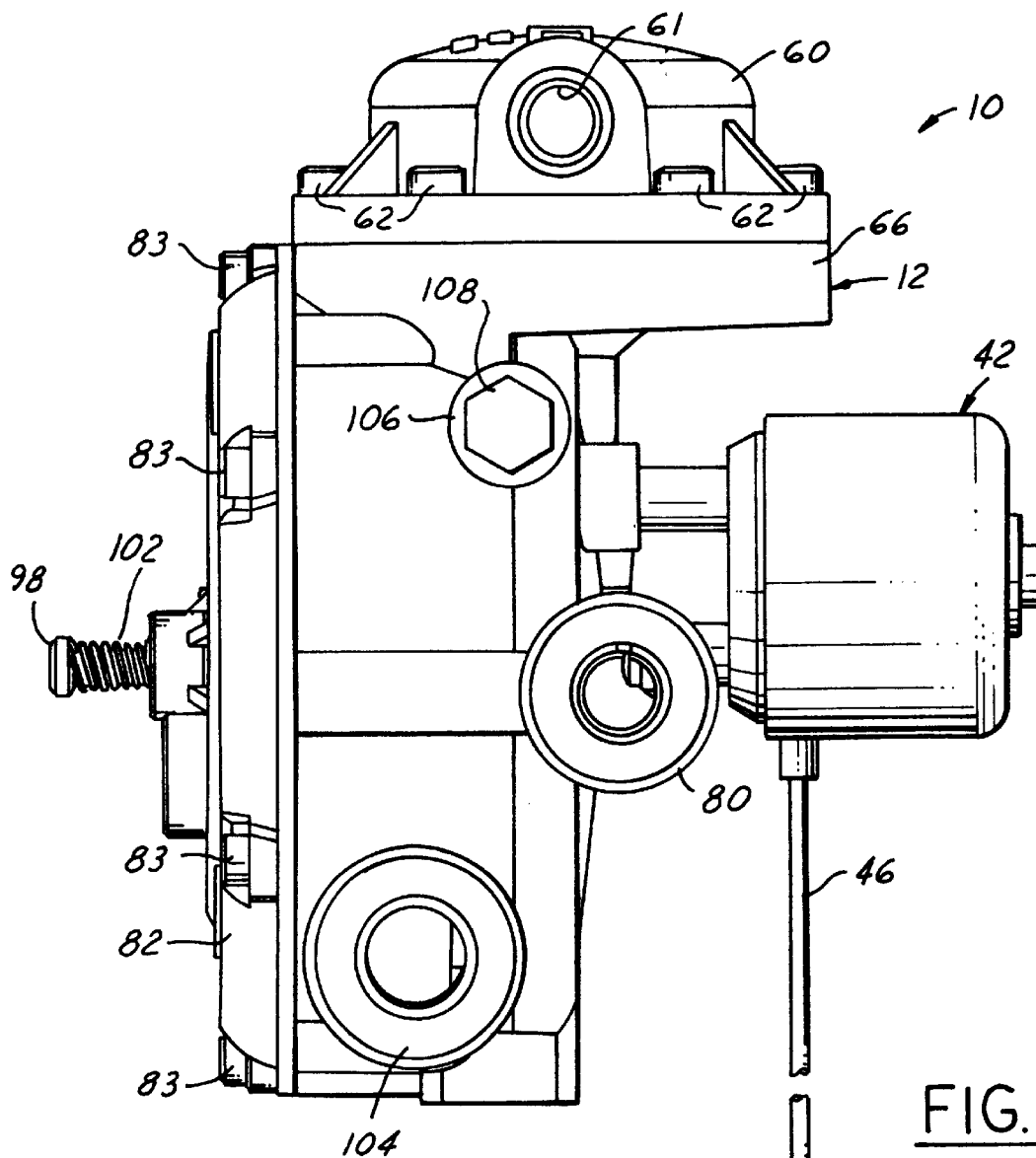
FIG. 1 is a side elevational view of an integrated fuel control unit in accordance with a presently preferred embodiment of the invention.
Figure 1:
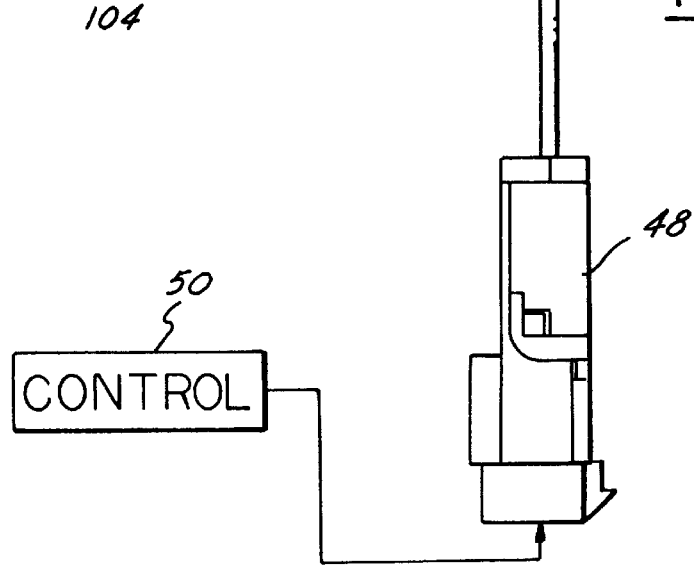

A tubular primary fuel orifice 38 (FIG. 2) is fixedly secured within base 12. The outlet end of orifice 38 (the left end in FIG. 2) is disposed adjacent to seal 30, such that fuel flow through orifice 38 is controlled in part by seal 30, lever 20, diaphragm 14 and spring 26. The opposing or inlet end of orifice 38 is disposed within an inlet fuel passage 40 in base 12. A solenoid 42 is externally carried by base 12 adjacent to inlet passage 40. Solenoid 42 includes a solenoid coil 44 from which a conductor 46 extends to a connector 48 for connection to a suitable control unit 50 (FIG. 1). Control unit 50 may comprise an ECU, an ignition switch on the vehicle and associated with the engine, or an engine vacuum switch that closes when the engine is not operating. A plunger 52 is slidably disposed in a bearing sleeve 54 within coil 44, being urged by a coil spring 56 in the axial direction into opposed abutting engagement with the inlet end of orifice 38. A seal pad 58 of rubber or the like is carried at the end of plunger 52 for opposed seating engagement over the passage of orifice 38. An O-ring 59 (FIG. 2) is carried by base 12 in sealing engagement with sleeve 54. Thus, plunger 52 is urged by spring 56, and by inlet fuel pressure that passes through sleeve 54, into opposed seating engagement with orifice 38 so as to shut off flow of fuel through the orifice.

Fuel inlet passage 40 extends laterally to a side edge of base 12. A cover 60 is mounted by screws 62 on the side edge of base 12, and a fuel inlet filter 64 is captured between cover 60 and the opposing flange 66 of base 12. Filter 64 may be of woven polyester or the like. The fuel inlet filter may thus be readily cleaned by removal of cover 60. Inlet cover 60 has a laterally opening inlet port 61 (FIG. 1), preferably disposed on each side of cover 60 to facilitate assembly to an engine. An O-ring 67 (FIG. 2) is captured between cover 60 and flange 66.

A primary fuel chamber 68 is thus defined between diaphragm 14 and base 12. As best seen in FIG. 3, fuel flowing through primary chamber 68 is caused to flow through radial passages 70, and then through serpentine arcuate passages 72 to a secondary orifice 74 (FIG. 2), which is fixedly secured to cover 16 and extends through an opening in diaphragm 14 into a secondary fuel chamber 76. Arcuate passages 72 are characterized by a plurality of radial flow abutment ribs 78 extending from the arcuate walls 79 that define passages 72 to promote turbulence in the fuel, and to promote heat exchange between the fuel and the body of base 12. Base 12 has a pair of aligned interconnected ports 80 (FIGS. 1 and 2) on laterally opposed sides of the base for connection to the engine so as to receive a continuous flow of engine coolant or engine oil. Thus, engine coolant or engine oil flowing through base 12 heats and vaporizes the fuel as it flows through arcuate passages 72 to secondary orifice 74.

A secondary cover 82 is secured to base 12 by screws 83 (FIG. 1) so as to enclose secondary chamber 76. A secondary diaphragm 84 is carried by cover 82, with one side being exposed to secondary fuel chamber 76 and the other side being exposed to atmosphere through a vent opening 85 in cover 82. A secondary control lever 86 is coupled at one end to a plate 88 carried by diaphragm 84, and an opposing end carries a seal 90 that aligns with and selectively closes secondary orifice 74. Seal 90 is secured to lever 86 by a snap ring 91. As best seen in FIG. 4, secondary control lever 86 rocks on a pin 92 secured to base 12 by screws 94. A coil spring 96 is captured in compression within a pocket on base 12, and engages lever 86 normally to urge seal 90 to the closed position over orifice 74, as shown in FIG. 2. A plunger 98 is mounted to cover 82 by an O-ring 100, and is normally urged outwardly with respect to cover 82 by a coil spring 102 that surrounds and is captured around plunger 98. Plunger 98 may be selectively urged inwardly against diaphragm plate 88 so as to open orifice 74 and prime the engine. Plunger 98 may be manually operable as shown, or may be electrically operated. Base 12 has laterally opposed fuel outlet ports 104 that open to secondary chamber 76. Base 12 also carries a pressure test port 106, which is normally closed by a plug 108 (FIG. 1). Primary diaphragm 14, secondary diaphragm 84 and plunger 98 are thus aligned on a common axis. Primary lever 20 and secondary lever 86 are coupled to the respective diaphragms along this axis, and primary orifice 38 and secondary orifice 74 are laterally offset from this common axis.

In operation, fuel at inlet 61 of cover 60 flows through filter 64 to inlet passage 40 of base 12. When the engine is turned off and solenoid 42 is de-energized, plunger 52 blocks passage of fuel into primary orifice 38. When the engine is turned on and plunger 52 is retracted by energization of solenoid coil 44, inlet fuel is free to flow into orifice 38. Spring 26 normally biases diaphragm 14 so as to open primary control lever 20 and seal 30. The fuel may thus flow into primary chamber 68. When the pressure in secondary chamber 76 reaches a specified vacuum due to engine demand, secondary lever 86 and seal 90 open secondary orifice 74 and permit fuel flow to the secondary chamber, and thence through outlet port 104 to the engine. Fuel flowing from primary chamber 68 to secondary chamber 76 flows through heat exchange passages 72, and is vaporized by heat exchange from the engine coolant or engine oil. Under static conditions, when there is no demand for fuel, secondary valve 90 is closed against secondary orifice 74 by spring 96. When the fuel pressure in primary chamber 68 reaches a level sufficient to overcome the force of spring 26, primary valve 30 is closed. Pressure in primary chamber 68 is preferably regulated between 4.71 and 8.25 psi. Fuel is permitted to flow through secondary orifice 74 into secondary chamber 76 when the pressure within the secondary chamber reaches a specified difference between the vent port and the fuel port—e.g., about 0.5 inches of water. Two-stage pressure regulation is thus obtained. Heat exchange to fuel flowing between the primary and secondary chambers counteracts the refrigeration effect of vaporizing the LPG, and helps insure that fuel flowing to secondary chamber is in vapor phase.

Figure 5:
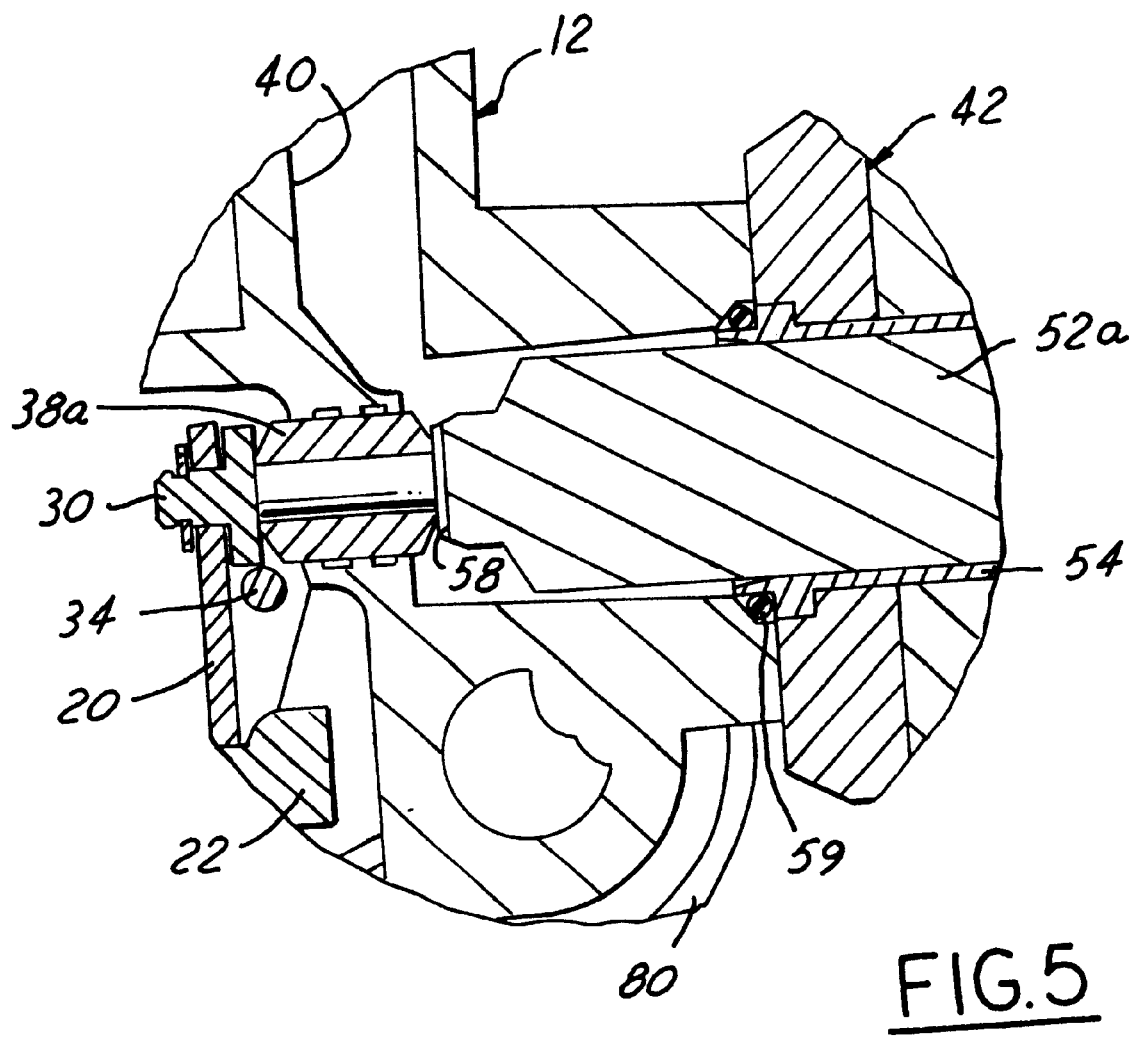
FIG. 5 is a fragmentary sectional view similar to a portion of FIG. 2 but illustration a modification in accordance with the invention.

FIG. 5 illustrates a modification to FIG. 2, in which primary orifice 38a is foreshortened and solenoid plunger 52a is elongated. The modification of FIG. 5 has the advantage that a lesser amount of residual fuel (e.g., 0.1557 cc) is trapped in orifice 38a when solenoid 42 is de-energized, reducing the possibility of backfire in high duty cycle and hot engine applications.

There has thus been disclosed an integrated fuel control unit for gas-operated engines that fully satisfies all of the objects and aims previously set forth. The fuel control unit embodies a fuel inlet filter, a high-pressure lock-off and a fuel vaporizer/pressure regulator integrated into a single assembly. Solenoid 42 cooperates with primary orifice 38 affirmatively to block fuel flow to the engine when the engine is not in operation. The integrated control unit reduces assembly time and the number of component parts that would otherwise be necessary in systems in which the fuel inlet filter, high-pressure lock-off and fuel vaporizer/pressure regulator are provided as separate units. The unit requires a reduced amount of installation space on or associated with an engine. Although the invention has been disclosed in conjunction with a presently preferred embodiment, alternatives and modifications will readily suggest themselves to persons of ordinary skill in the art. The invention is intended to encompass all such modifications and variations as fall within the spirit and broad scope of the appended claims.

What is claimed is:

1. An integrated fuel control unit for gas-operated internal combustion engines, which includes:

a base, a primary diaphragm secured to said base and defining a primary fuel chamber, a primary orifice carried by said base, a primary control lever mounted on said base and coupled to said primary diaphragm for controlling flow of fuel through said primary orifice, a secondary diaphragm secured to said base and defining a secondary fuel chamber, a secondary orifice carried between said primary and secondary chambers, a secondary control lever mounted on said base and coupled to said secondary diaphragm for controlling flow of fuel through said secondary orifice, heat exchange means in said body for vaporizing fuel between said primary and secondary chambers, a high-pressure fuel lock-off carried by said body, including a solenoid coil mounted on said body and a solenoid plunger within said coil for selectivity closing an end of said primary orifice remote from said primary control lever, and a fuel inlet filter carried by said body for filtering fuel prior to passage to said primary orifice and said lock-off, wherein the fuel lock-off is operable independently of engine demand.

2. The fuel control unit set forth in claim 1 wherein said solenoid coil is configured for energization by keying on of an ignition.

3. The fuel control unit set forth in claim 2 wherein said solenoid coil is configured for de-energization by keying off the ignition.

4. The fuel control unit set forth in claim 3 wherein said fuel inlet filter is carried on a lateral side of said base, and wherein said base includes a fuel passage extending laterally from said fuel inlet filter to said end of said primary orifice.

5. The fuel control unit set forth in claim 4 wherein said solenoid coil is mounted on an end of said base in alignment with said primary orifice, and wherein a spring urges said plunger against said end of said primary orifice, application of electrical power to said solenoid coil overcoming force of said spring and moving said plunger away from said primary orifice so as to permit flow of fuel into said primary orifice.

6. The fuel control unit set forth in claim 3 wherein said heat exchange means comprises a passage that extends through said base for receiving engine coolant or engine oil, and serpentine arcuate passage means on said base for routing fuel through said primary fuel chamber to said secondary orifice.

7. The fuel control unit set forth in claim 6 wherein said heat exchange means further comprises ribs extending into said passage means for promoting turbulence in fuel flowing through said passage means.

8. The fuel control unit set forth in claim 3 further comprising a plate securing said primary diaphragm to said base, so as to form said primary fuel chamber between said primary diaphragm and said base and a third chamber between said primary diaphragm and said plate, and a first spring disposed in said third chamber urging said primary diaphragm and said primary control lever in a direction to permit flow of fuel through said primary orifice.

9. The fuel control unit set forth in claim 8 further comprising a vent opening in said plate operatively coupling said third chamber to said secondary chamber.

10. The fuel control unit set forth in claim 9 further comprising a second spring disposed in said secondary chamber urging said secondary control lever in a direction to block flow of fuel through said secondary orifice.

11. The fuel control unit set forth in claim 10 further comprising a cover secured to said base over said secondary diaphragm, a plunger carried by said cover for engagement with said secondary diaphragm m to move said secondary lever in a direction to permit flow of fuel through said secondary orifice, and a third spring urging said plunger away from said secondary diaphragm, depression of said plunger against said third spring opening said secondary orifice to permit priming of an engine.

12. The fuel control unit set forth in claim 11 wherein said primary diaphragm, said secondary diaphragm and said plunger are aligned on a common axis, and wherein said primary orifice and said secondary orifice are offset from said common axis.

13. The fuel control unit set forth in claim 3 wherein said fuel lock-off is located in close proximity to said primary orifice and residual fuel is minimized allowing near instantaneous fuel shut-off by selectively de-energizing said coil.

* * * * *